UNITED STATES PATENT OFFICE.

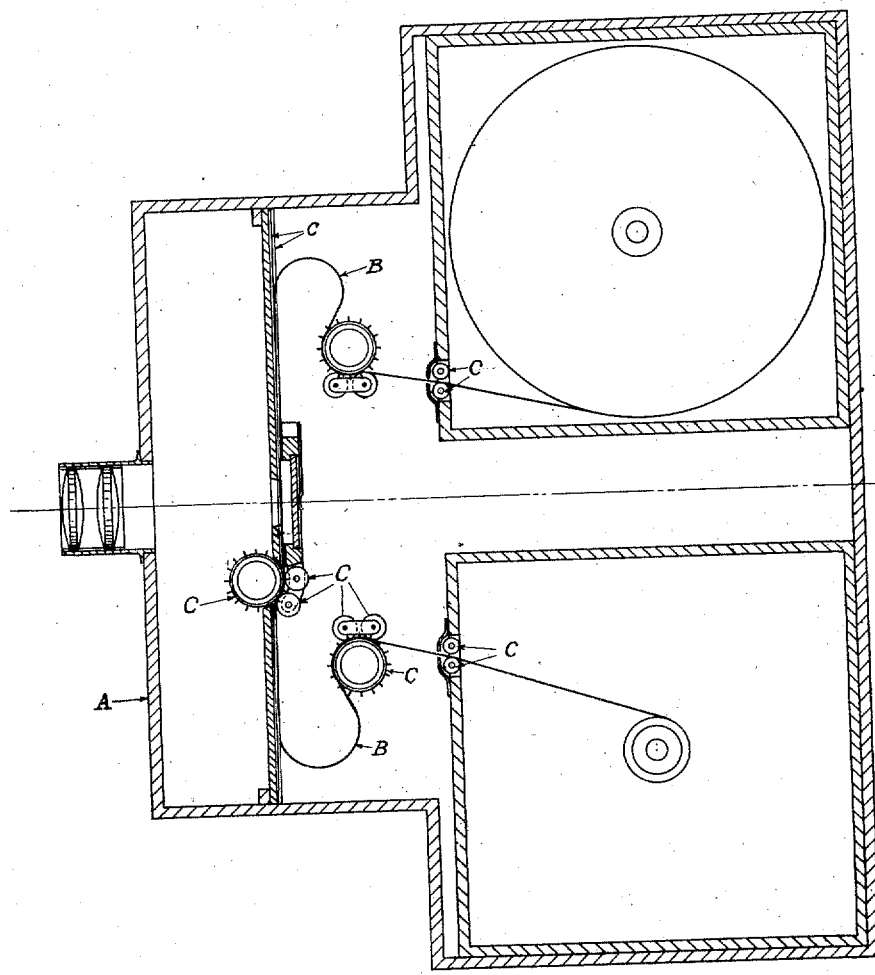

GEORGE W. NUSBAUM, OF TAKOMA PARK, MARYLAND.

MEANS FOR PREVENTING THE GENERATION OF STATIC ELECTRICITY IN MOVING-PICTURE APPARATUS.

1,206,357.      Specification of Letters Patent.      Patented Nov. 28, 1916.

Application filed August 7, 1914. Serial No. 855,581.

*To all whom it may concern:*

Be it known that I, GEORGE W. NUSBAUM, a citizen of the United States, residing at Takoma Park, in the county of Montgomery and State of Maryland, have invented a new Means for Preventing the Generation of Static Electricity in Moving-Picture Apparatus, of which the following is a specification.

The object of my invention is to prevent the generation of static electricity by a movable dielectric member, such as the films used in moving picture apparatus.

In the accompanying drawing I have shown a sectional diagrammatic view of a moving picture camera in which my invention is embodied.

In the drawing, "A" represents the framework of a moving picture camera, "B" represents a strip of dielectric material which is movable with respect to the framework. The movable dielectric is guided in its movements by parts of the framework, such as guideways, rollers and other surfaces which have a movable contact with the dielectric, and which are indicated on the drawing by the letter "C." The dielectric member, in the device illustrated, is a film of sensitized celluloid such as commonly used in photographic work, but, of course, the specific material of which the dielectric is composed is immaterial; my invention being applicable to any dielectric.

It is well known that owing to the great speed of the film in moving picture apparatus, and the necessity for guiding surfaces, in contact with which the film moves, a large amount of static electricity is generated, and the sparks resulting from the discharge of the same affect the sensitized surface and often ruin the entire film.

Various methods have been resorted to for the purpose of overcoming this difficulty and preventing the generation of static electricity in perforating machines and cameras, most of which however are attended with difficulties of a more or less serious nature.

I have found that the generation of static electricity and its attendant evils can be prevented in a very effective manner by making the film guiding surfaces, such as rollers and retainers, etc., in movable contact with the film, of a material having the same composition or the same electro-static characteristics as the film; for example, if the film is made of celluloid, the rollers and guides should be made of celluloid. My invention in its broad sense however, is not limited to material having the same composition as the film but it is sufficient if the material used has the same electrical characteristics when subjected to friction.

My experiments have shown that it is not essential that all the surfaces in contact with the film be of the same material as the film itself but that the use of such material for the parts of the apparatus as exert considerable pressure on the film is sufficient. Theoretically, all surfaces in moving contact with the film should be of material having the same electro-static characteristics as the film in order to entirely prevent the generation of static electricity but I have found that the amount of static electricity generated diminishes as the ratio of the bearing surfaces of such material, to the total bearing surfaces, increases. Since the harmful effect of the static electricity is due to the light from the discharges caused thereby, it is sufficient if the tension of the static electricity be kept so low that discharges do not result, and this can be accomplished by properly proportioning the contact surfaces of the above mentioned material to any other suitable material.

Having explained my method, what I claim as my invention or discovery and what I desire to secure by Letters Patent is:

1. In an apparatus of the class described, a frame, a dielectric member movable with respect to the frame and means for preventing the generation of static electricity by the moving dielectric, comprising surfaces in movable contact therewith of a material similar to the movable dielectric.

2. In an apparatus of the class described, a frame, a dielectric member movable with respect to the frame, and means for preventing the generation of static electricity by the movable dielectric, comprising surfaces in movable contact therewith of the same material as the movable dielectric.

3. In an apparatus of the class described, a frame, a ribbon of dielectric material movable with respect to the frame, and means for preventing the generation of static electricity by said ribbon comprising surfaces in movable contact with said ribbon of a substance similar to the movable ribbon.

4. In an apparatus of the class described, a frame, a dielectric member movable with respect to the frame, and means for preventing the generation of static electricity by said dielectric, comprising surfaces in movable contact therewith of material having the same electrical characteristics when subjected to the influence of friction.

5. In an apparatus of the class described, in combination, a frame, a member of dielectric material movable with respect to the frame, and means for preventing the generation of static electricity by said dielectric member, comprising surfaces in movable contact therewith composed of material having the same composition as the movable dielectric.

6. In an apparatus of the class described, in combination, a frame, a dielectric member movable with respect to the frame, and means for limiting the amount of static electricity generated by said dielectric, comprising surfaces in movable contact therewith composed of material having the same electro-static characteristics when subjected to friction.

7. In an apparatus of the class described, a frame, a celluloid film movable with respect to the frame, and means for limiting the amount of static electricity generated by the celluloid film, comprising surfaces of celluloid in movable contact therewith.

8. In a moving picture camera, a frame, a film of dielectric material movable with respect to the frame, and means for limiting the amount of static electricity generated by said film, comprising guiding surfaces in movable contact with the film composed of material having the same electro-static characteristics, when subjected to friction, as the film.

G. W. NUSBAUM.

Witnesses:
R. S. CYPHERS,
LEWIS RIGGLES.